United States Patent [19]
Pearman

[11] Patent Number: 6,046,672
[45] Date of Patent: Apr. 4, 2000

[54] TIRE DEFLATION DETECTOR

[76] Inventor: Kevin Patrick Austin Pearman, P.O. Box No. 79253, Senderwood, 2145, South Africa

[21] Appl. No.: 08/910,487

[22] Filed: Jul. 28, 1997

[51] Int. Cl.[7] .................................................. B60C 23/00
[52] U.S. Cl. ......................... 340/447; 340/442; 340/693; 73/146.5
[58] Field of Search .................................. 340/442, 443, 340/445, 447, 448, 693; 73/146.5, 146.4, 146.8, 146.2

[56] References Cited

U.S. PATENT DOCUMENTS

| | | | |
|---|---|---|---|
| 4,075,603 | 2/1978 | Snyder et al. | 340/447 |
| 4,163,208 | 7/1979 | Merz | 340/447 |
| 4,468,650 | 8/1984 | Barbee | 340/447 |
| 4,539,496 | 9/1985 | Thomas et al. | 340/442 |
| 5,228,337 | 7/1993 | Sharpe et al. | 340/445 |
| 5,600,301 | 2/1997 | Robinson, III | 340/442 |

*Primary Examiner*—Daniel J. Wu
*Attorney, Agent, or Firm*—Myers Bigel Sibley & Sajovec, P.A.

[57] ABSTRACT

The present invention provides a tire condition indicating device having a detector for detecting the condition of a tire on a wheel of a vehicle rotatable about a wheel axis, preferably for detecting pressure of the tire, a signal emitter emitting a signal when the detector detects the condition and power supply device providing power to the signal emitter the power supply device having an electric power generator including first and second parts that are relatively rotatable about a generator axis, the first part connected to the wheel to rotate.

20 Claims, 15 Drawing Sheets

TIRE DEFLATION DETECTOR

BACKGROUND OF THE INVENTION

When tires on vehicles and in particular on loaded trucks are under inflated or flat this causes serious problems. In particular riding on a loaded truck on under-inflated or flat tires causes a massive heat build-up and distortion of the profile of the tires which destroys under-inflated or flat tires completely, i.e. not just the tread but the sidewalls and the carcase.

When a "flat" occurs on a side-by-side configuration, the good tire then bears the load of both the tires causing excessive wear on the good tire. If this condition persists the two tires bulge and rub against each other causing a tremendous heat build-up in both tires and the resultant destruction of both tires. This is a costly event as of course is the down time of the vehicle. Furthermore there is the serious problem of large chunks of tire (often the tread of retreaded tires) falling off, being either thrown by the tire into the path of on-coming traffic or just lying in the path of traffic threatening damage to vehicles on the road. Such thrown off tire chunks may also snag and damage the brake lines resulting in brake failure.

It will be appreciated that tires, and in particular tires used trucks and lorries, are extremely expensive items so that the destruction of a tire has serious economic consequences. In addition if one or more tires are deflated this will cause increase drag on the lorry which will result in increased fuel consumption and consequent cost in the running of the truck or lorry.

A major problem with multi-wheel vehicles is that where there is a flat on under-inflation of one or more tires, by the time the driver is aware of this problem it is usually too late.

Numerous deflation detectors have been proposed to provide the driver of a vehicle of warnings that one or more tires are under-inflated. The bulk of these devices include detectors incorporated into the tire inflation valves with batteries that provide a signal when the pressure falls. Typical of such devices are those which are described and illustrated in GB 2 267 179-A, GB 1 294 967 and EP-0 351 997-A2.

While these devices may be satisfactory in operation when initially set up, they suffer from the problem that the driver will normally be unaware of when the batteries run down and consequently that the devices are inoperative.

BRIEF SUMMARY OF THE INVENTION

According to one aspect of the present invention there is provided a tire condition indicating device comprising a detector for detecting the condition of a tire on a wheel or a wheel of a vehicle rotatable about a wheel axis, preferably for detecting pressure of the tire, a signal emitter emitting a signal when the detector detects the said condition and power supply means providing power to the signal emitter to emit the signal as aforesaid, wherein the power supply means comprises an electric power generator comprising first and second parts that are relatively rotatable about a generator axis, the first part connected to the wheel to rotate thereby.

The first part is preferably rotatable with the wheel and the wheel axis and generator axis are coincident. The second part is conveniently attached to a member arranged to be stationery or substantially stationery when the wheel is rotating, preferably by being attached to an offset weight which tends to hold the second part stationery when the wheel rotates. The offset weight conveniently comprises a cross plate attached to the second part and a mass member, preferably a substantially hemi-cylindrical part, the ends of which are connected to the ends of the cross plate so as to be carried by the cross plate eccentrically of the generator axis.

The second part preferably comprises a permanent magnet located within an electromagnetic core which comprises the first part there being windings on the core connected to the signal emitter to provide it with electric power. The permanent magnet is preferably arranged within north south axis parallel to the generator axis.

BRIEF DESCRIPTION OF THE DRAWINGS

Embodiments of the invention will now be described by way of example with reference to the accompanying drawings.

In the drawings.

DETAILED DESCRIPTION OF THE INVENTION

Figure 1:
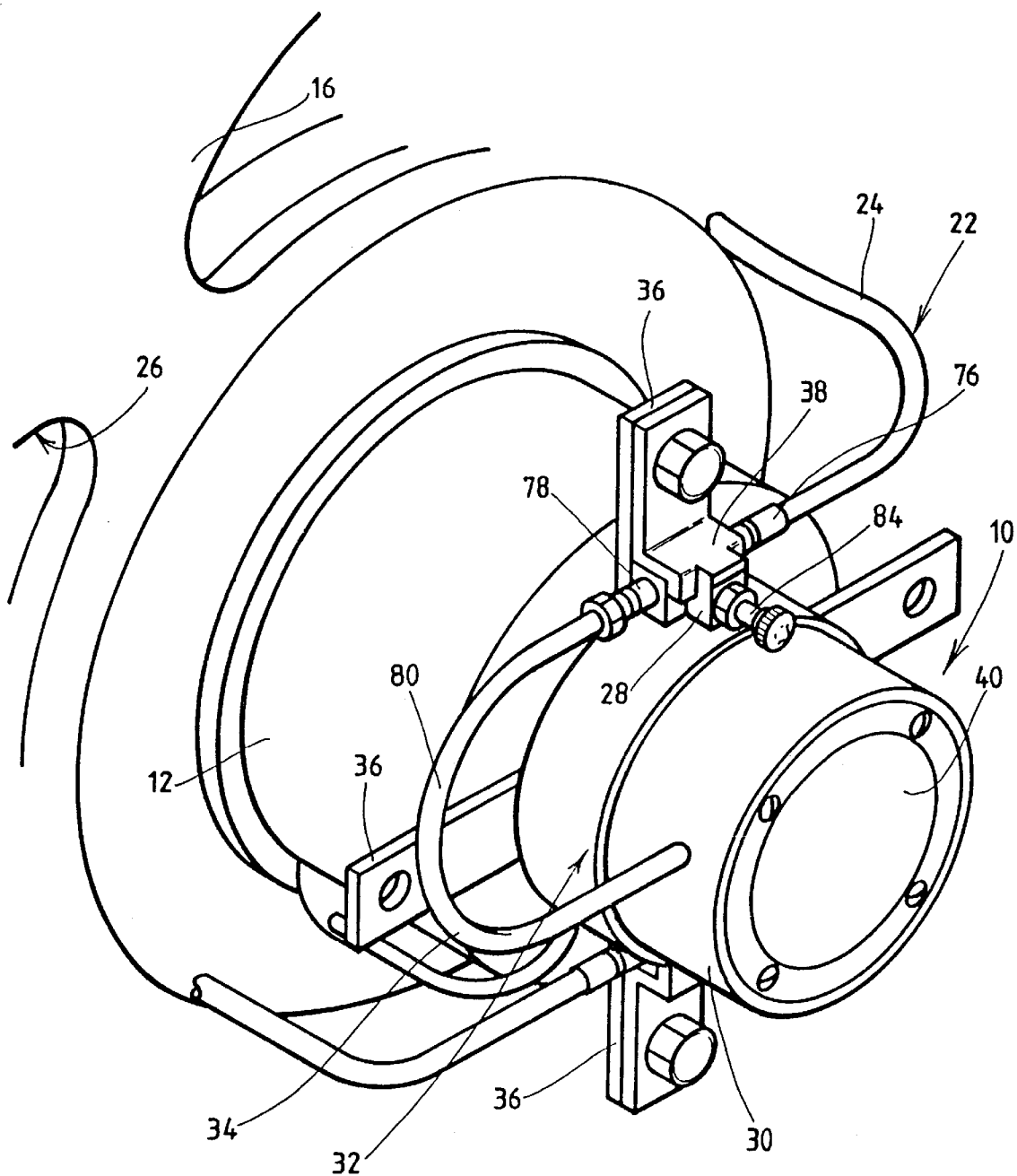
FIG. 1 is a perspective view of a unit of the invention.
Figure 2:
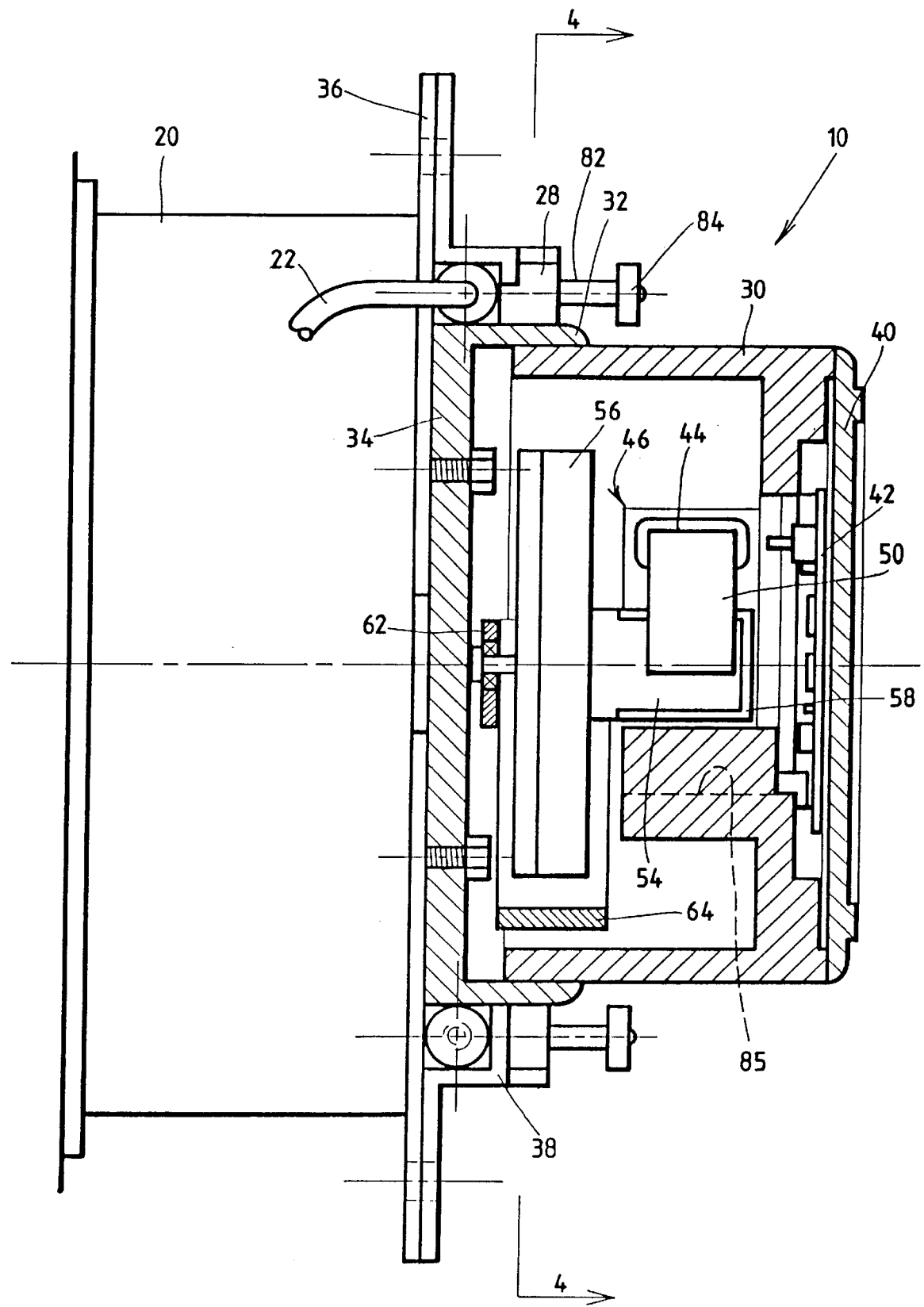
FIG. 2 is a longitudinal section through the unit of FIG. 1.
Figure 3:
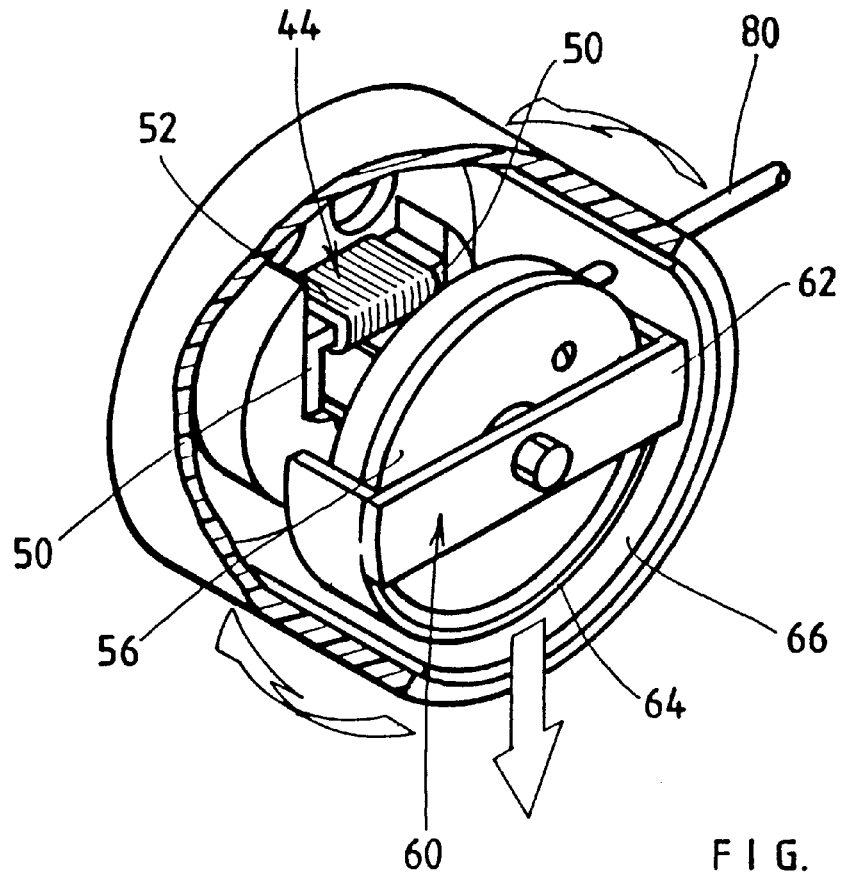
FIG. 3 is a detail perspective view of the unit partially broken away.

Referring now to FIGS. 1 to 8 there is shown a deflation detector unit 10 of the invention. The unit 10 is intended for use on a hub 12 of a lorry or truck 14. The hub 12 carries two wheels 16 (see FIG. 6) respectively carrying tires 18 (which may be tubeless tires or tires with tubes) and includes a shaft end housing 20 on which the unit 10 is carried. A connection 22 is made to the valve of each tire depressing the core of the valve to hold it open. This connection 22 includes a flexible hollow pipe 24 which passes through the ventilation openings 26 of the wheels 16 (see FIG. 7) and are respectively connected to two "T"-piece 28 which are connected to the unit 10 as will be described below.

Figure 9A:
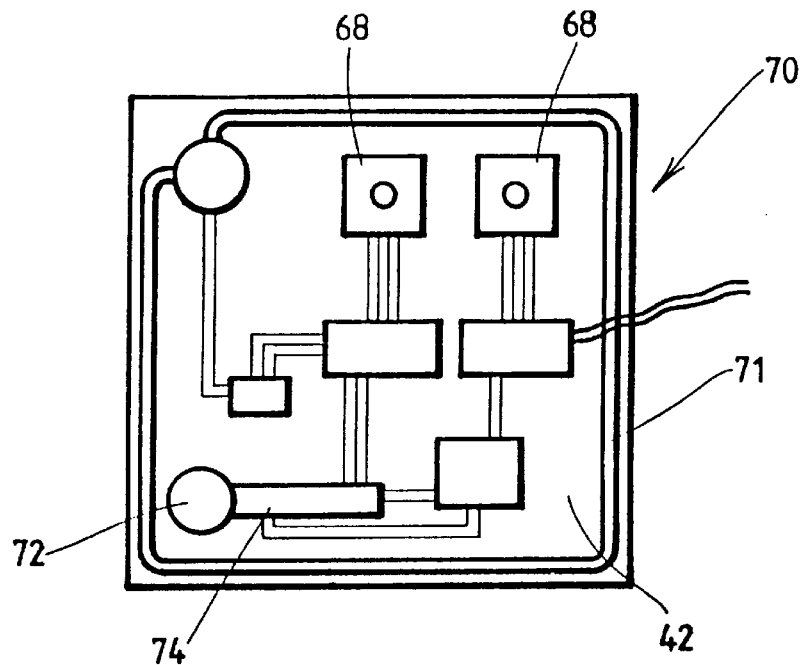
FIGS. 9a and 9b are respectively plan and perspective views of a printed circuit board forming part of the unit.
Figure 9B:
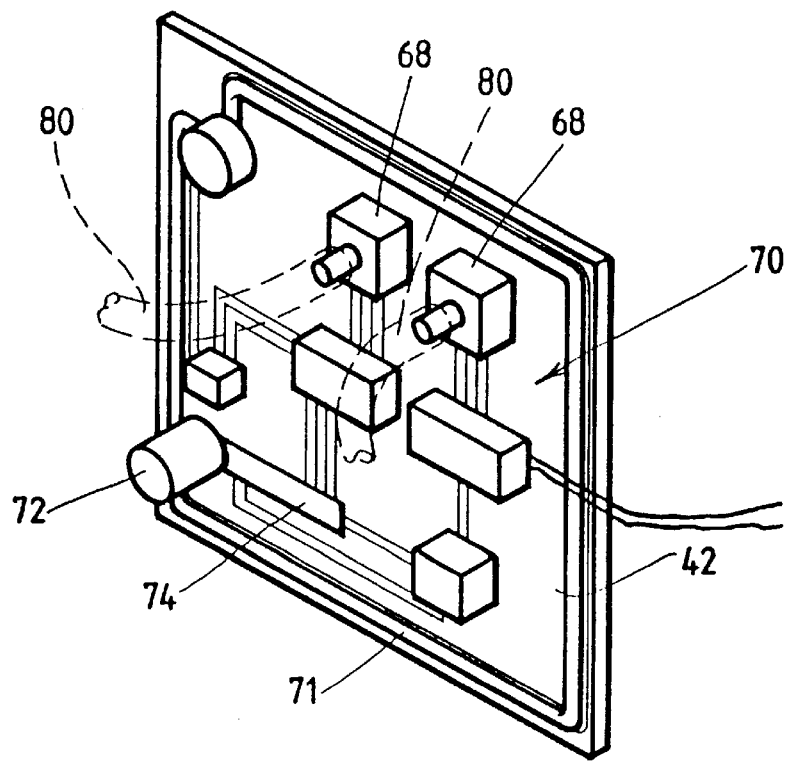
Figure 10:
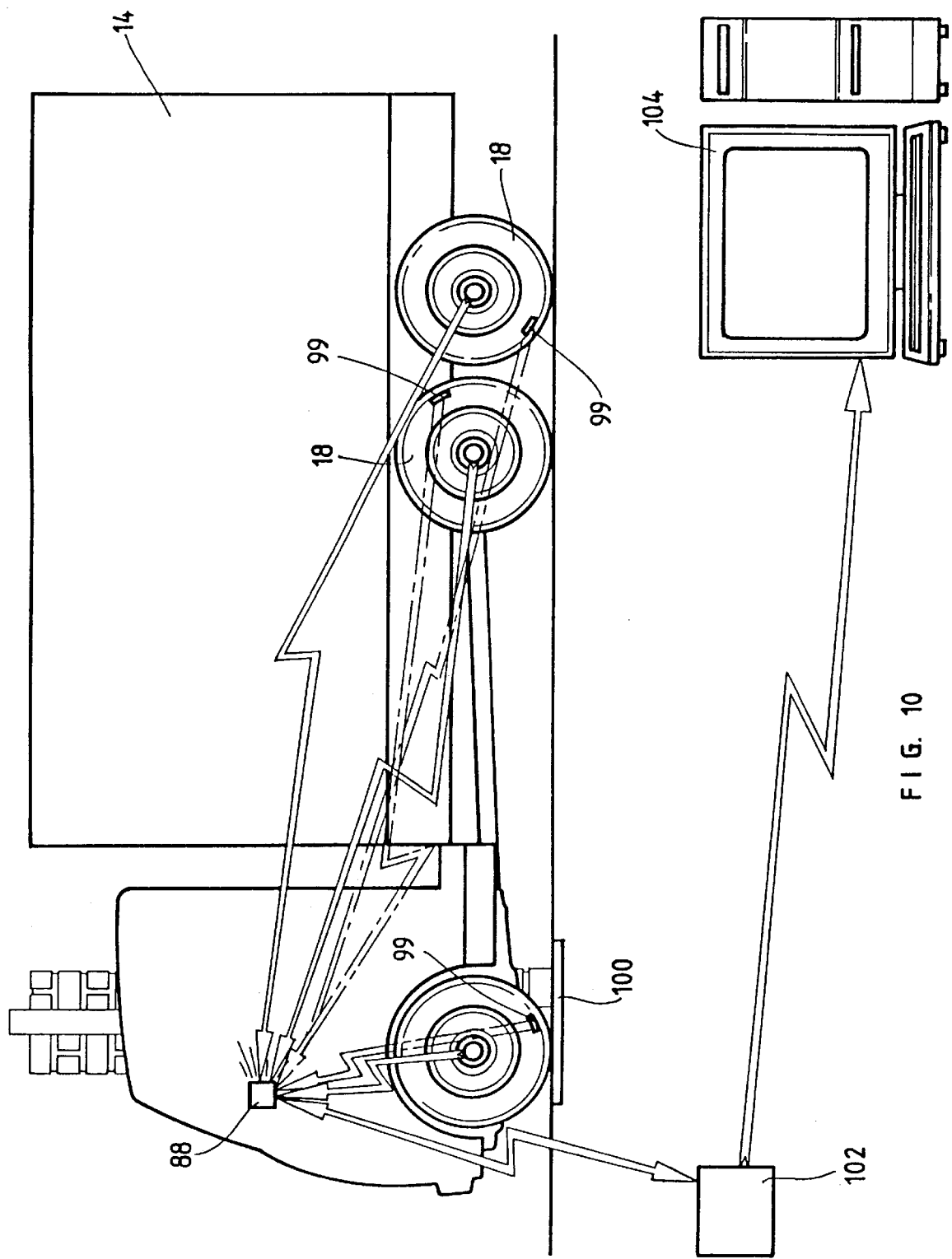
FIG. 10 is a view of a control arrangement of the invention.

The detector unit comprises a cylindrical body 30 the inner end of which fits into the cylindrical rim 32 of a connector/closure plate 34 that is screwed to the shaft end housing 20 and to a pair of plates 36 that are arranged in a cross and two have clamps 38 at their ends holding the "T"-pieces 28 in position. The outer end of the body 30 is closed by a end closure 40 which carries a printed circuit board (PCB) 42 on its inner face (see FIGS. 9A and 9B).

The body 30 carries the stator 44 of an electric motor 46 in a recess in a built up central portion 48. The stator 44 comprises an electromagnet having two arms 50 joined by a cross-member 52. The rotor of the motor 46 is comprised by a plastic shaft 54 that is journalled in a carrier disc 56 secured to the end of the portion 48. The shaft has a longitudinal slot in its end and their carries a permanent magnet 58 projecting beyond the sides of the slot and having one pole at the end of the shaft and the other pole at the inward portion of the slot. The shaft 54 projects through the carrier disc 56 and is there connected to an eccentric weight 60. This weight 60 comprises a cross-plate 62 secured to its ends to a heavy part cylindrical mass 64 that sub-tends slightly more than 180° at the centre. This mass 64 projects into the annular space 66 between the central portion 48 and the outside wall of the body 30 and there can be relative rotation between the body and the weight 60. Thus as the body rotates with the wheels, the eccentric weight 60 tends to remain stationary and thus there is relative rotation between the rotor shaft 54 and the stator 44 so that the motor generates electricity for use as will be described. There will be two electric pulses per revolution of the wheel.

The PCB 42 carries a pair of pressure transducers 68, a transmitter (indicated generally at 70) and a vibration detector in the form of a hammer 72 carried on a flexible plate 74 that is mounted on the PCB 42.

An electronic temperature sensor is secured to one of the bolts holding bearing dust cap (not shown).

The vibration detector serves to detect separation of the tread surface of a tire from the casing. The temperature sensor is provided to detect any undue increase in temperature caused by either a binding brake or a faulty wheel bearing.

The transducers 68, the vibration detector 72 and the temperature sensor are connected to the transmitter 70 in known manner. A delay mechanism is incorporated in the electronics of the vibration detector or of the transmitter to prevent unnecessary readings from undulations and bumps in the road surface.

The IC chip of the transmitter 70 incorporates a "sleep timer" which will boot up the transmitter after a predetermined period, preferably every two minutes. It will further incorporate a timer that will cause the transmitter to transmit a signal, which will be highly compressed, after a predetermined period after boot up. This period will differ from wheel to wheel so that the chance of the signal from one transmitter interfering with the signal of another will be minimised if not wholly eliminated. Conveniently the period may be twenty seconds from the end of boot up plus one second for each tire number, i.e. the transmitter controlled by tire number 17 will be transmit its signal after thirty seven seconds, i.e. twenty seconds plus seventeen. As each transmitter is controlled by two wheels, it will send out two signals (normally one second apart as the two wheels will normally have consecutive numbers).

The chip will receive information from the pressure transducers, vibration detector and temperature sensor at all times. This information will be transmitted by the transmitter, together with a code identifying the wheel in respect of which the signal is being sent during the transmission discussed above.

The antenna for the transmitter 70 is formed by a strip of printed material 71 running around the circumference of the PCB 42.

As mentioned above the pipe 22 is connected to the "T"-piece 28, being attached to one arm 76 thereof, the aligned arm 78 of which is connected to another pipe 80 which passes through the wall of the body of the unit and is connected to one of the transducers 68. The leg 82 of the "T"-piece is connected to a valve body 84 which includes a Schrader valve and through which the tire to which it is connected may be inflated.

The central portion 48 of the body also has a pair of cylindrical bores 85 within each of which is received a stack of nickel cadmium batteries 86 that powers the PCB 42 when the vehicle is stationary. These stacks are connected to be recharged by the electric motor 46 during travel of the vehicle.

The transmitter 70 on each wheel hub sends signals to a receiver 88 (see FIG. 8) that is located within the cabin 90 of the lorry 14. The signals identify the tire about which the signal is being sent. This receiver has a digital display 92 which gives a reading for the condition of a tire and a secondary display 94 which identifies the particular tire whose condition is being given by the display 92. In addition there is an audible warning indicator 96 which is conveniently a buzzer.

The receiver will incorporate a real time clock installed into its electronics and all faults are stored with the exact time and date attached to them.

It will be appreciated that the receiver will receive information on four separate faults for each axle position, i.e. two pressure signals (one for each tire), one temperature and one vibration.

The receiver will also include a filter which can be "set" before each journey of the lorry 14 so that signals relating only to the particular tires on the lorry are stored in memory and reflected on the display 92. This "setting" is a "learning" exercise. This exercise occurs when the vehicle is started and continues for the first twenty minutes (which would normally include the ten minutes or so before it commences on a journey during which the engine is allows to warm up). A number of signals may during this time be received as the vehicle may be in a yard in close proximity to other vehicles. The filter then goes into a "verify" cycle for a further twenty minutes during which time it stores the signals received during the first phase, During the third cycle, the receiver clears the register, compares the signals received during the first two phases and then locks on to only those signals that appeared during both phases. Any other signals sent before and after the verify (second) cycles are either ignored or are retained as "rogue" signals. Thus extraneous signals from other lorries which may be travelling with or in the opposite direction to the lorry 14 will thereafter not affect the signals given by the receiver in that lorry.

Three press buttons 98.1, 98.2 and 98.3 enable the driver to shuttle back and forth to select the particular tire being checked and also which characteristic is being reported. In addition the receiver contains a computer chip including a counter and a memory that can be down-loaded into a main control computer at vehicle storage garage. One of these buttons is a "re-set" button. When it is depressed, the tire pressure value at which the warning operation commences is increased, preferably 0,5 Bar up to a maximum, conveniently of 9,5 Bar, whereafter it reverts back to a default setting which is conveniently 5,5 Bar. Another button 98.2 serves to activate the circuit to display the current value of the setting.

The arrangement will operate as follows:—Once the pressure in a tire falls below a pre-set initial pressure by a unit of pressure, say one half bar, the audible warning indicator 96 will give a warning sound. At the same time the display 94 identifies the tire and the display 92 indicates the pressure in the tire. This operation is repeated for each fall of a unit of pressure. If the pressure in more than one tire falls as aforesaid, the receiver will jump from the indication of one tire to the other at the fall of a unit of pressure.

The driver of the lorry 14 will now be alerted if any tire is deflated. He will know by the time interval between the unit falls of the tire (i.e. the rate at which he receives a signal for each tire) and also the degree of deflation indicated whether he must stop immediately to replace the deflated tire or whether he can continue to the next place where the tire can be inflated and how if at all he must change his driving speed etc. In addition the particular tire will be identified so that when the lorry has stopped, the driver will be able immediately to inspect the tire identified by the system as being faulty. Indeed the driver will get a check of the condition of tires before setting out on a journey so that he can ensure that the tires are correctly inflated at that time.

In the same way, the driver will receive signals informing him as to the vibration and temperature conditions of each axle position.

Fitted to each tire 18 at a convenient position e.g. at the bead area of the tire is a micro-transmitter 98 incorporating a lithium battery (not shown). The micro-transmitter 98 is arranged when activated (as will be described below) to transmit over a short distance a unique code signal for the tire by which it is carried. A receiver (not shown) (hereinafter called a "code receiver") is provided on the PCB 42.

Because of the provision of the micro-transmitter 98 in the tires, a check can be made on the operation and performance of the tires. An activator plate 100 is placed at the gate of the garage and activates a magnetic switch. As each tire passes over the plate 100, the magnetic field activates the micro-processor 98 which emits the code signal that is received both by the code receiver and a receiver 102 at the gate which in turn transmits this information to the main garage computer 104. Thus there will be a track of each tire as it leaves the garage. The plate 100 will also activate the micro-processor 98 on the return of the lorry to the garage and will also activate the transmitter 70 to transmit to the receiver the number of revolutions that the tire has made, (i.e. one half of the number of pulses received). Thus the main computer will retain information about how many revolutions the tire has completed and hence the distance (i.e. milage or kilometrage) completed by the tire. This enables the truck operator to know when the tire must be retreaded and indeed when the tire has completed sufficient number of rotations (and has been retreaded sufficiently often) for its life. These two factors will be detected also by inspection at the garage so that the operator will know other information regarding the tires and their performance. Possibly more important the operator will know the cost per kilometer for each tire.

In addition there will be a control when the lorry returns to the garage as the number of rotations made until then, i.e. the exact kilometerage will be supplied to the main computer. Consequently if the lorry does not follow the set down route, this will be apparent to the operator.

Figure 11:
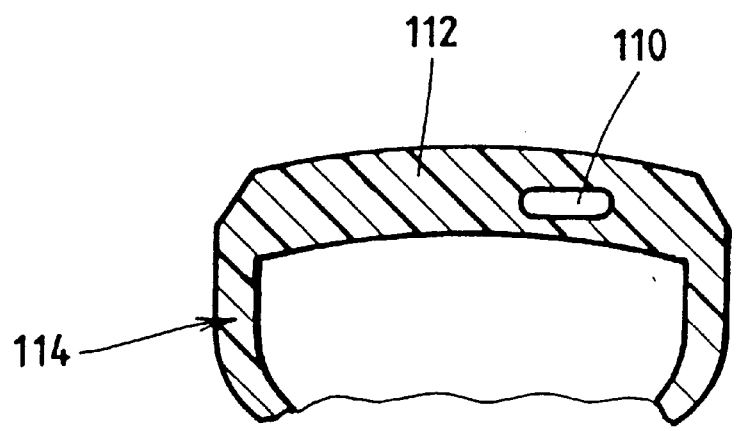
FIGS. 11a–11e show electric diagrams for the main control, a transmitter, the receiver, a pressure sensor and the temperature sensor section of the transmitter.
Figure 4:
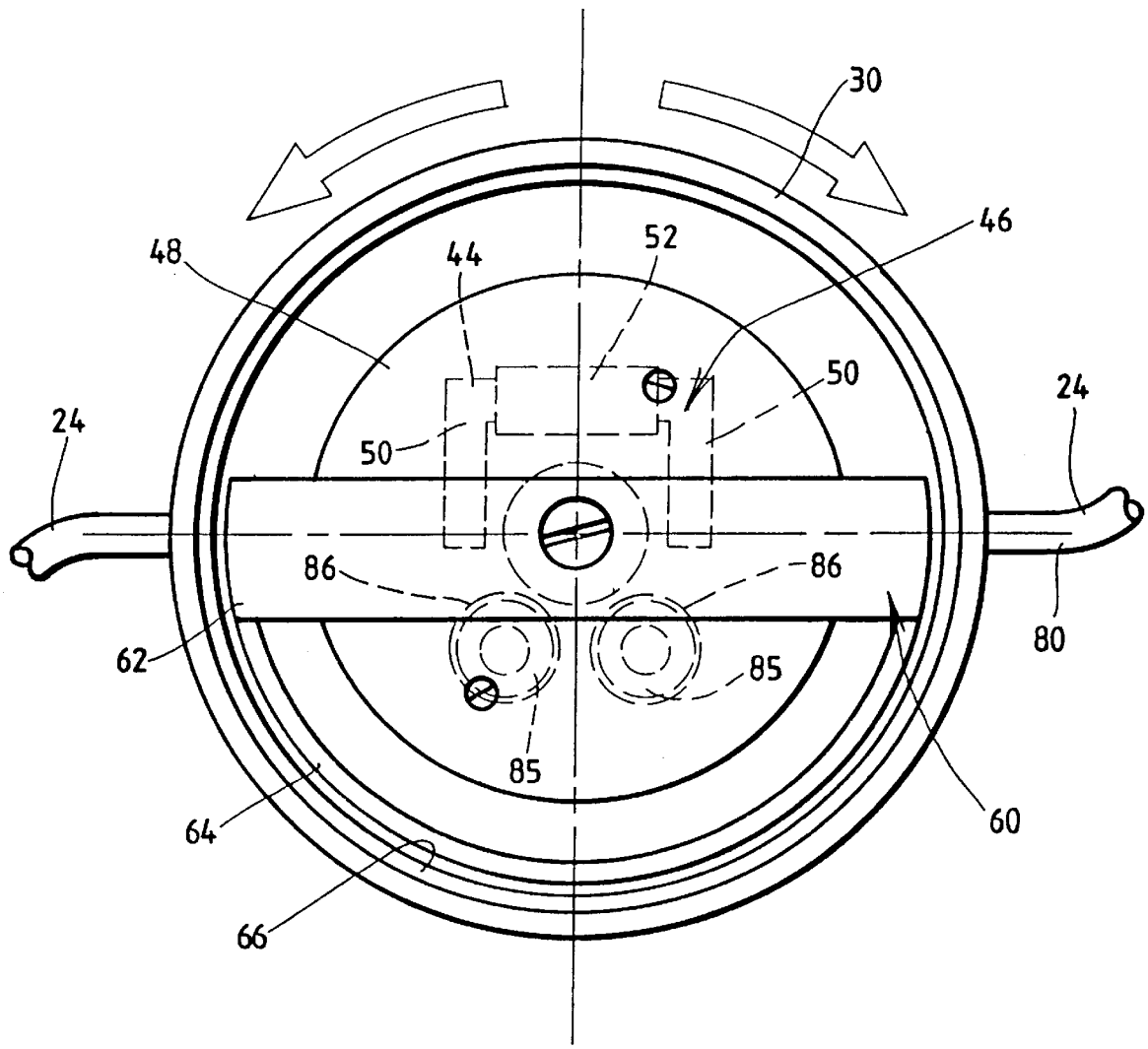
FIG. 4 is a section on line 4—4 of FIG. 2.
Figure 5:
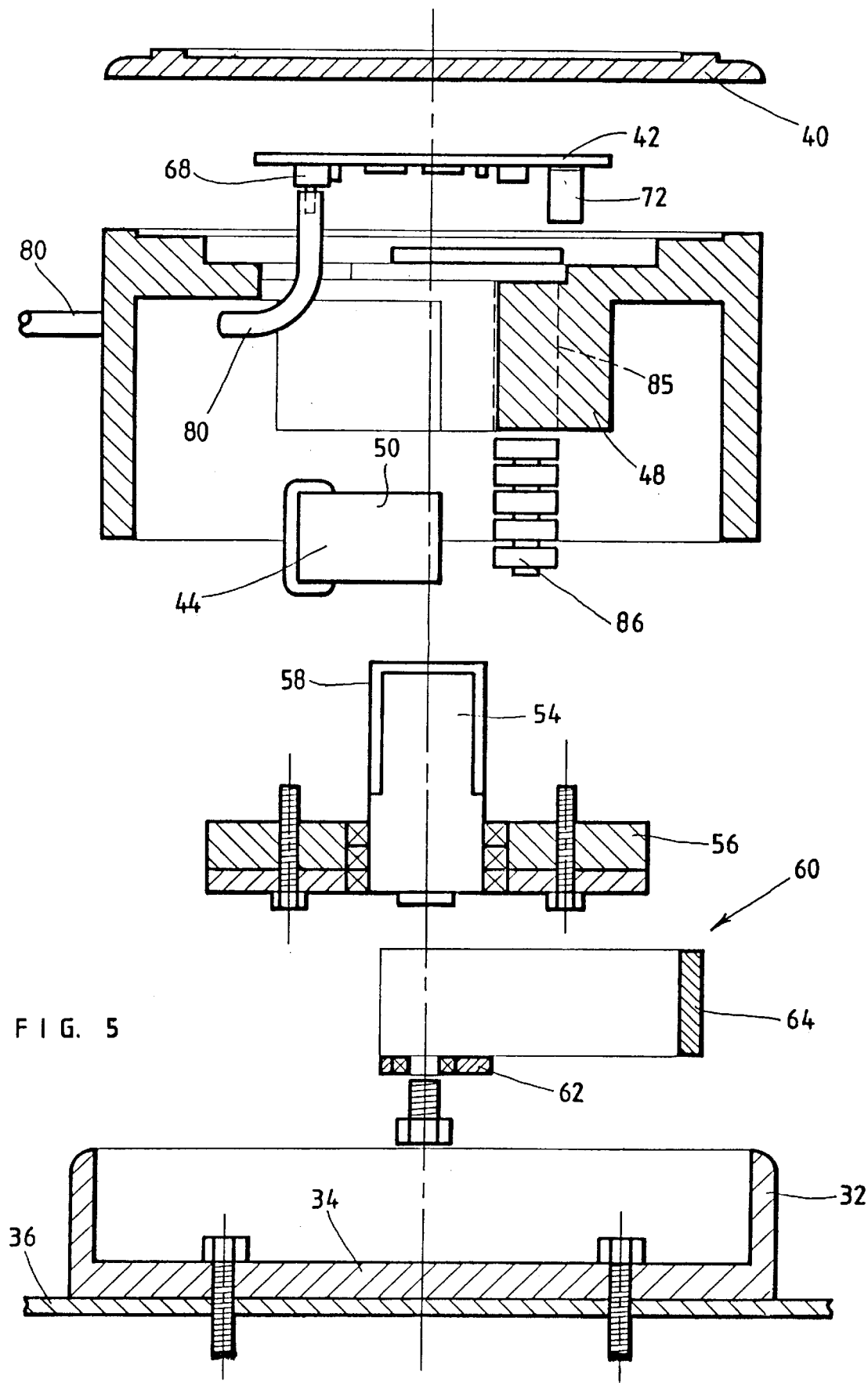
FIG. 5 is an exploded view of the unit
Figure 6:
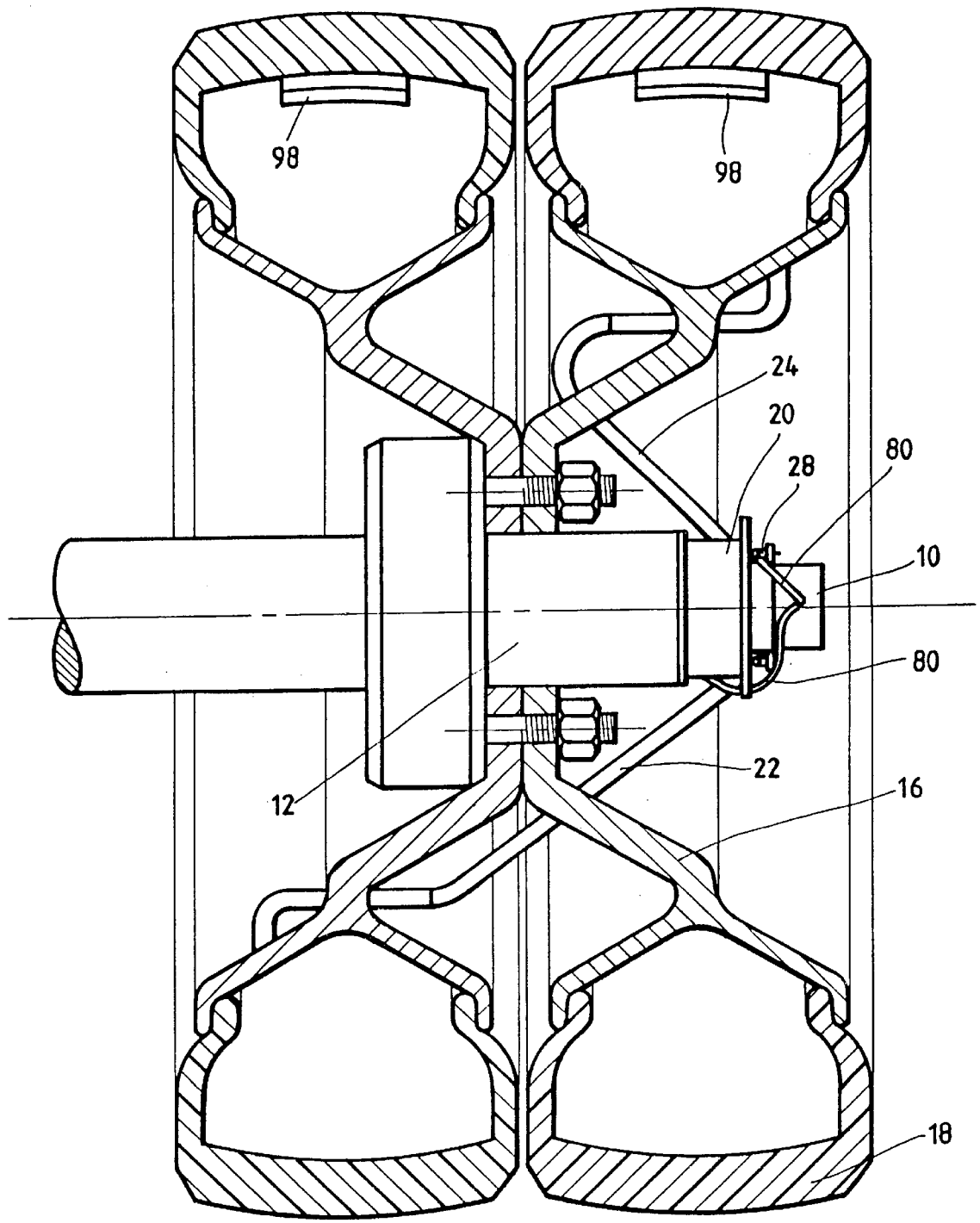
FIG. 6 is a perspective view of the unit in position on a two wheel hub of a lorry
Figure 7:
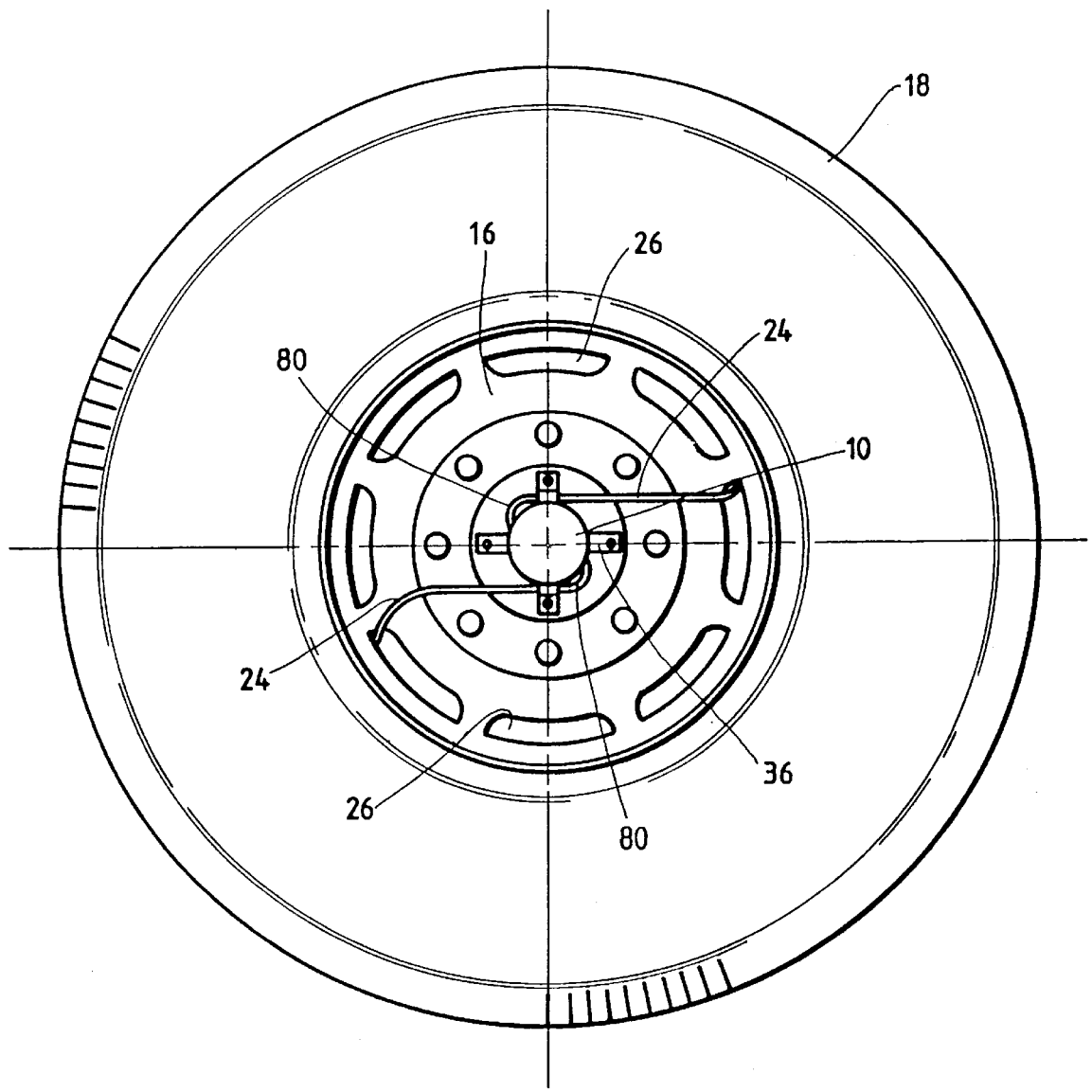
FIG. 7 is a view in the direction of arrow 7 of FIG. 6.

As shown in FIG. 11 a modified arrangement will incorporate a passive transponder 110 may be inserted into the material of the tread 112 of a tire 114 instead of the micro processor 98. This can be used where the plate 100 can provide a sufficient magnetic flux to actuate the transponder even when it is at the top of wheel when passing over the plate 100.

In the arrangement above described, the information stored in the receiver can be recovered in a number of ways. The information can be downloaded from the receiver by means of a "lap top" computer brought to the receiver 88 at the end of each journey. Alternatively there can be an automatic downloading of data by means of a radio signal to the main computer 104 the receiver being activated by a magnetic or radio signal activated by the plate 100 (or any other device) at the entrance to the depot to which the vehicle is returning. Of course the data can be captured visually from the receiver 88 and then transferred to the main computer 104 manually.

It will be seen that in addition to the operational advantages mentioned above, there will always be an electric power supply to the transmitter 72 when the vehicle is travelling. Thus battery failure, through exhaustion would not be a problem. Indeed the software is arranged to give an indication if any one of the detectors/transmitters is not operating. Furthermore it will be seen that it will be easy to reach the various parts of the unit for maintenance and replacement. In addition it will be seen that the locations for the attachment of the sockets of the inflator for the tires will be very convenient and much more convenient than in the conventional tires especially the inner tires.

The invention is not limited to the precise constructional details hereinbefore described and illustrated in the drawings. The unit can be used on each hub of a lorry having more or less tires and indeed can be used with advantage on a conventional motor car. The audible warning signal may be a hooter, siren or whistle.

Should the vehicle incorporate a tacho-graph the receiver may also be linked thereto. When a fault occurs, a pulse is sent to the tacho-graph which will provide management with a double point of reference as to the exact time and date of the fault as well as all the other information that the tacho-graph provides such as speed etc.

The code receiver may be provided on a separate receiver within the unit or the main receiver box within the cab.

Electric circuit diagrams for the main control, a transmitter, the receiver, a pressure sensor and the temperature sensor section of the transmitter are shown in FIGS. 11A, 11B, 11C, 11D and 11E. The circuits are self explanatory when read with the following description of the operation thereof.

TRANSMITTER

On commencement of movement of the truck, the generator 46 activates the circuit. Upon activation, the battery stack 86 is switched into power the circuit. This occurs until the generator voltage exceeds 5 volts. A regulator prevents the voltage increasing further. At this point, the generator 46 supplies full power to the circuit in addition to recharging the battery stack 86. The battery stack 86 is thereafter only used during transmission, when the programmable integrated circuit (PIC) of controller 136 is actuated by the sleep timer mentioned above to transmit signals. The voltage supplied by the generator 46 is rectified by a rectifier bridge 122. At the moment the generator delivers power, a P channel field effect transistor (FET) 123 is switched on connecting battery stack 86 to the circuit. At the same time, an N channel FET 124 completes the circuit. When generator voltage exceeds 4.6 volts BROWN OUT circuit 125 activates switching off P channel FET 123, this removes the battery from the circuit, placing the battery stack in recharge mode. The battery is only used again during transmission.

Figure 11A:
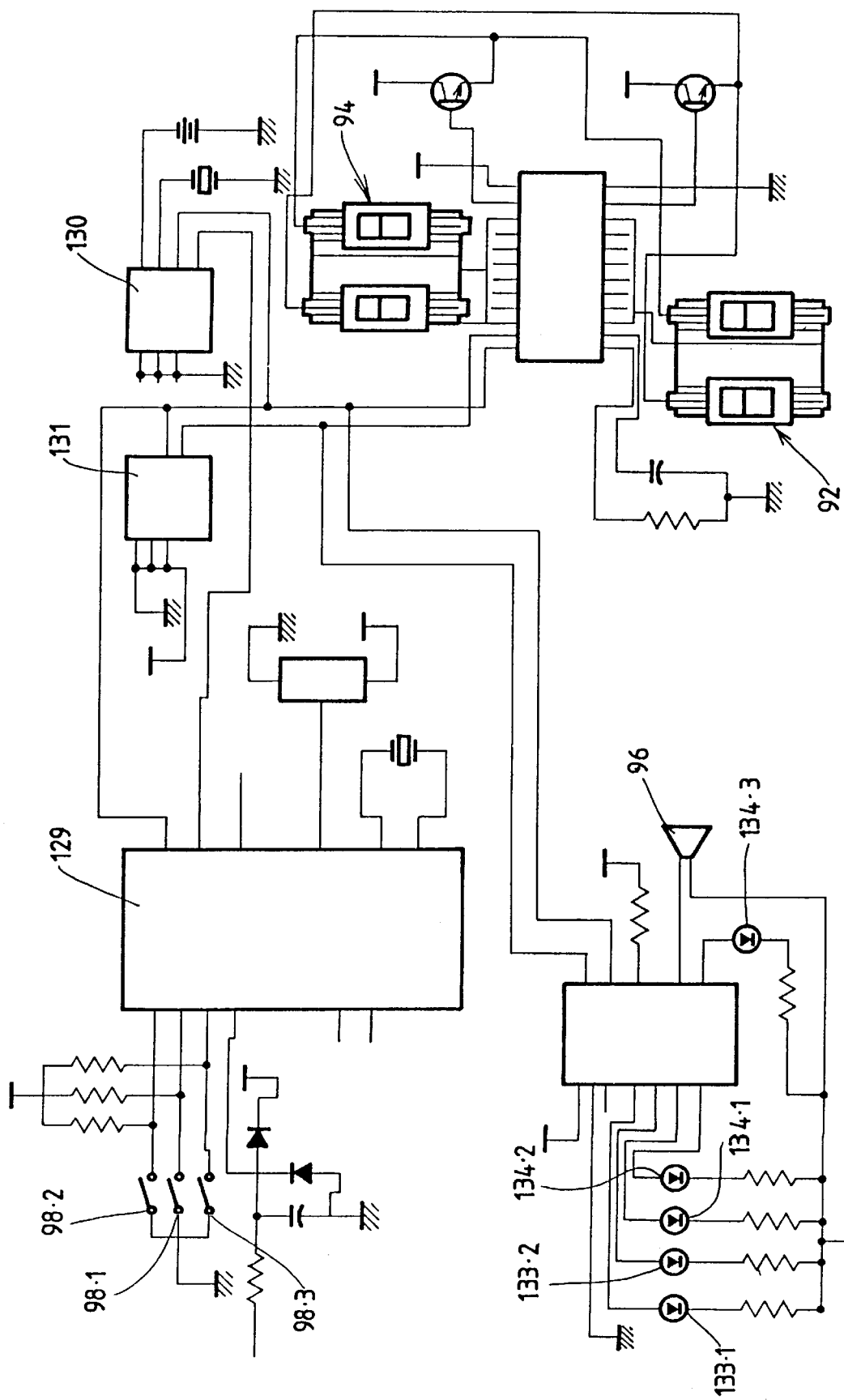
Figure 11B:
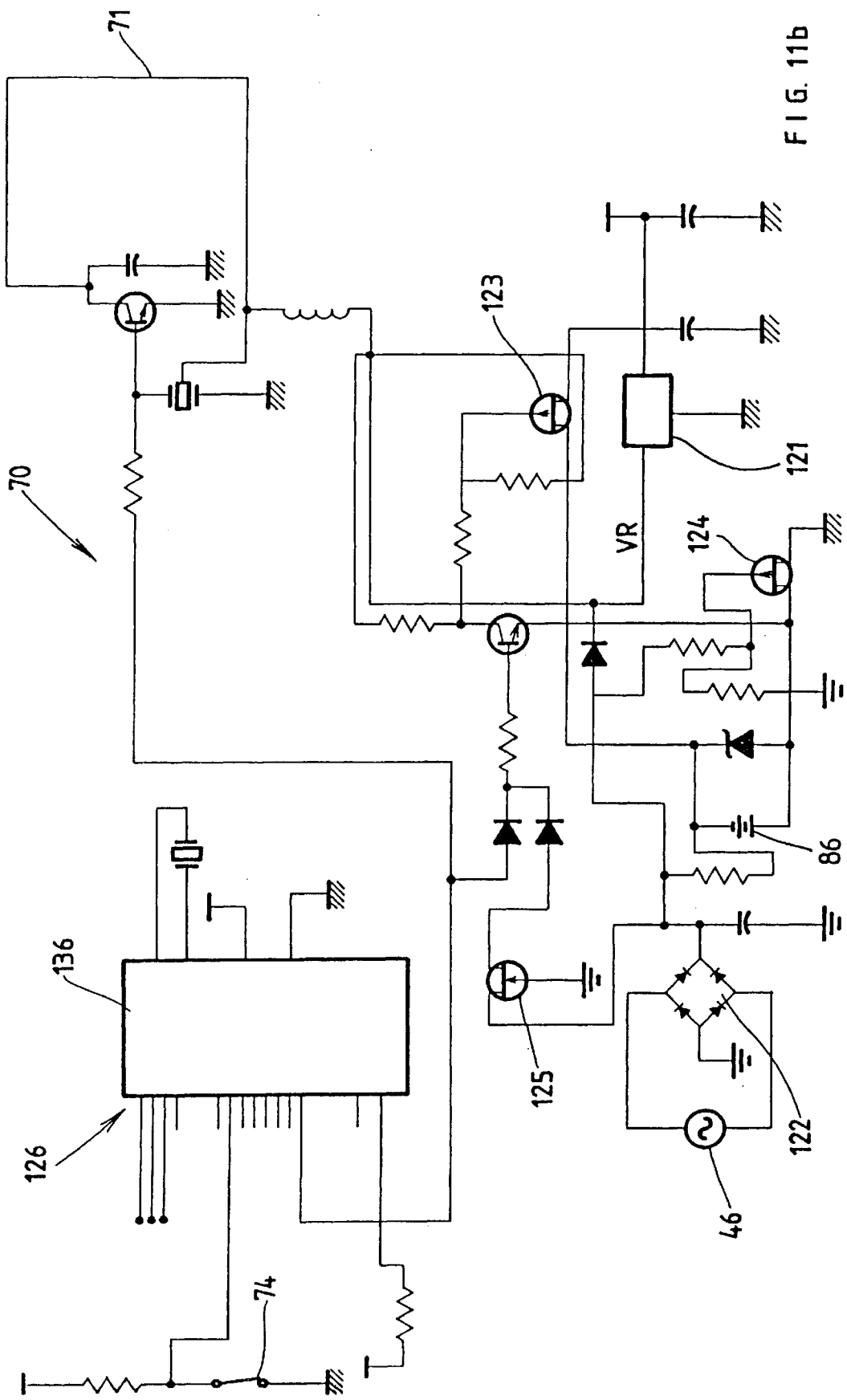
Figure 11C:
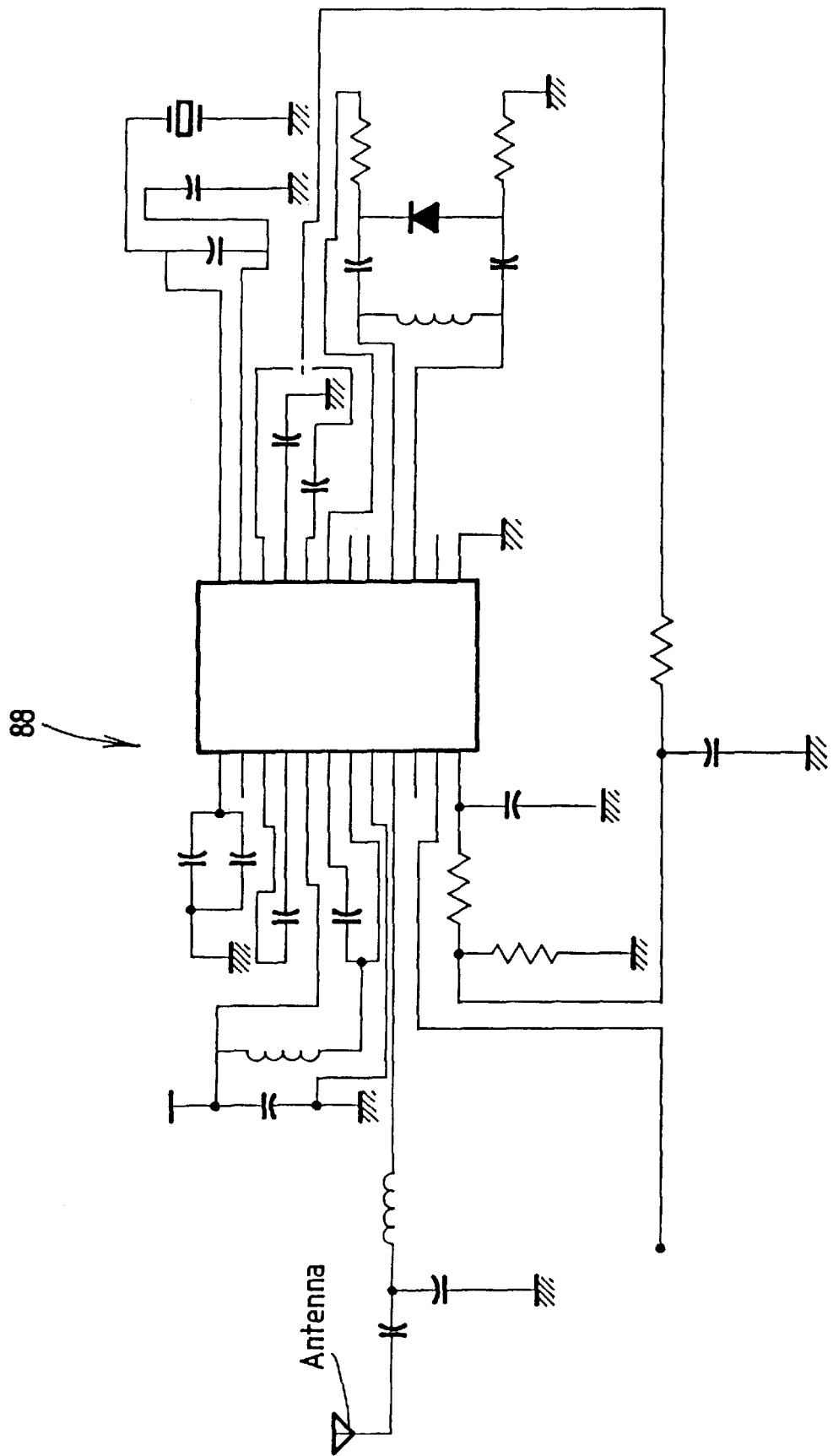
Figure 11D:
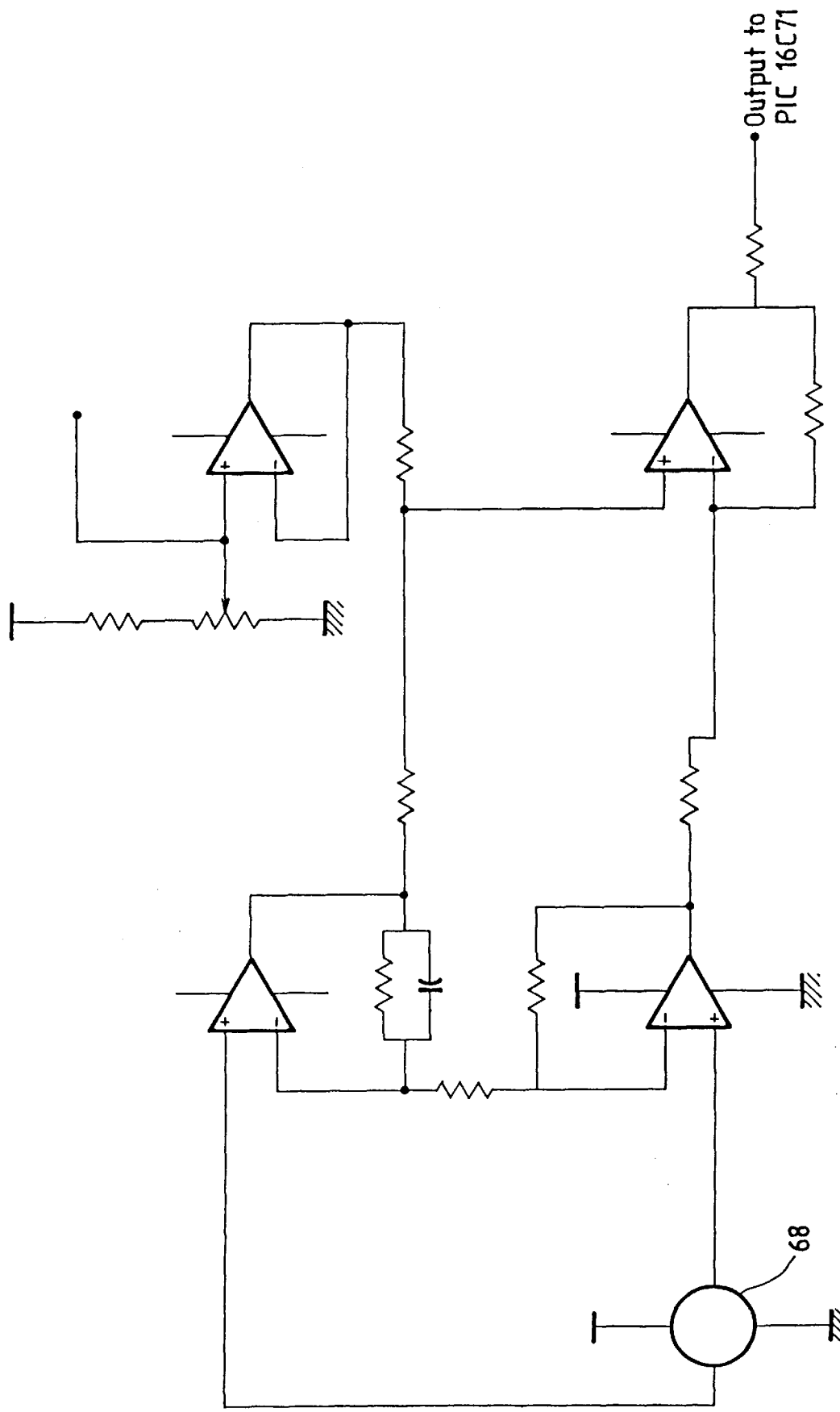
Figure 11E:
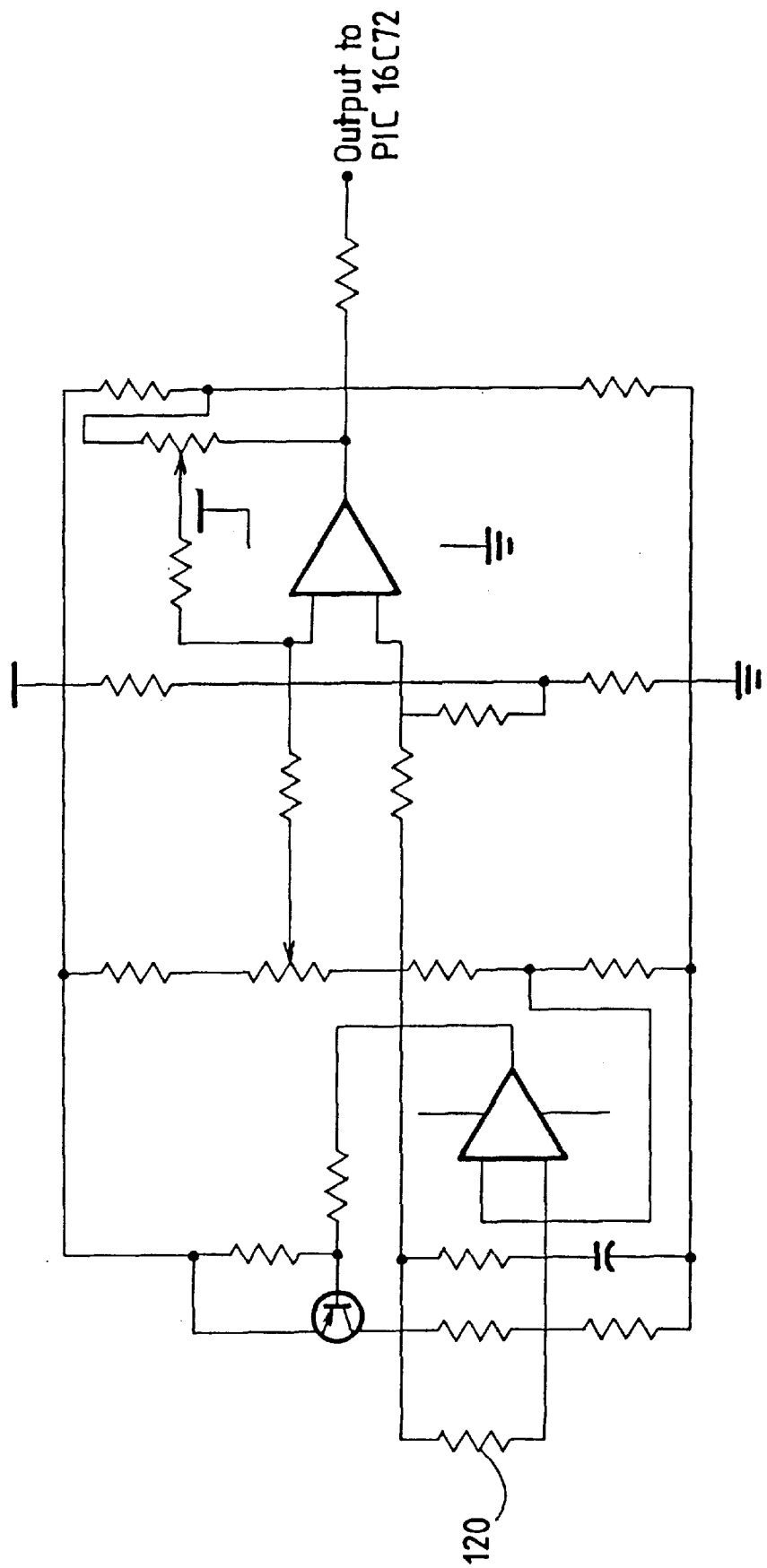

The tire pressure is sensed by the pressure transducer 68 (see FIGS. 9 and 11*d*). This information is transmitted to the A to D (analogue to digital) converters 126 where it is further processed and stored. The temperature is read via sensor 120 (see FIG. 11e) and is also transmitted to the A to D converters 126. Vibration is sensed at sensor 74 and transmitted to the processor's (136) port.

The processor 136 stores the above information and puts itself into a unique timing sequence. This timing sequence has been calculated in order to assure transmission without duplication or interference as has been described above. At the end of the timing sequence time out of timing sequence the stored information is transferred to the frequency locked transmitter 70.

RECEIVER

The data from each transmitter is recovered by the receiver 88 (see FIG. 11c) and transmitted to the programmable integrated circuit (PIC) or processor 129 for the receiver.

The data is stored within the processor 129. If a fault condition occurs, the processor reads the real time clock 130 and that point it allocates the time and date at which the fault occurred. The fault plus the time and date is then stored on external EE PROM 131. This is to ensure that during power down the fault data is not lost. This fault data can be uploaded via RS 232, 132, to a PC as us described above.

Figure 8:
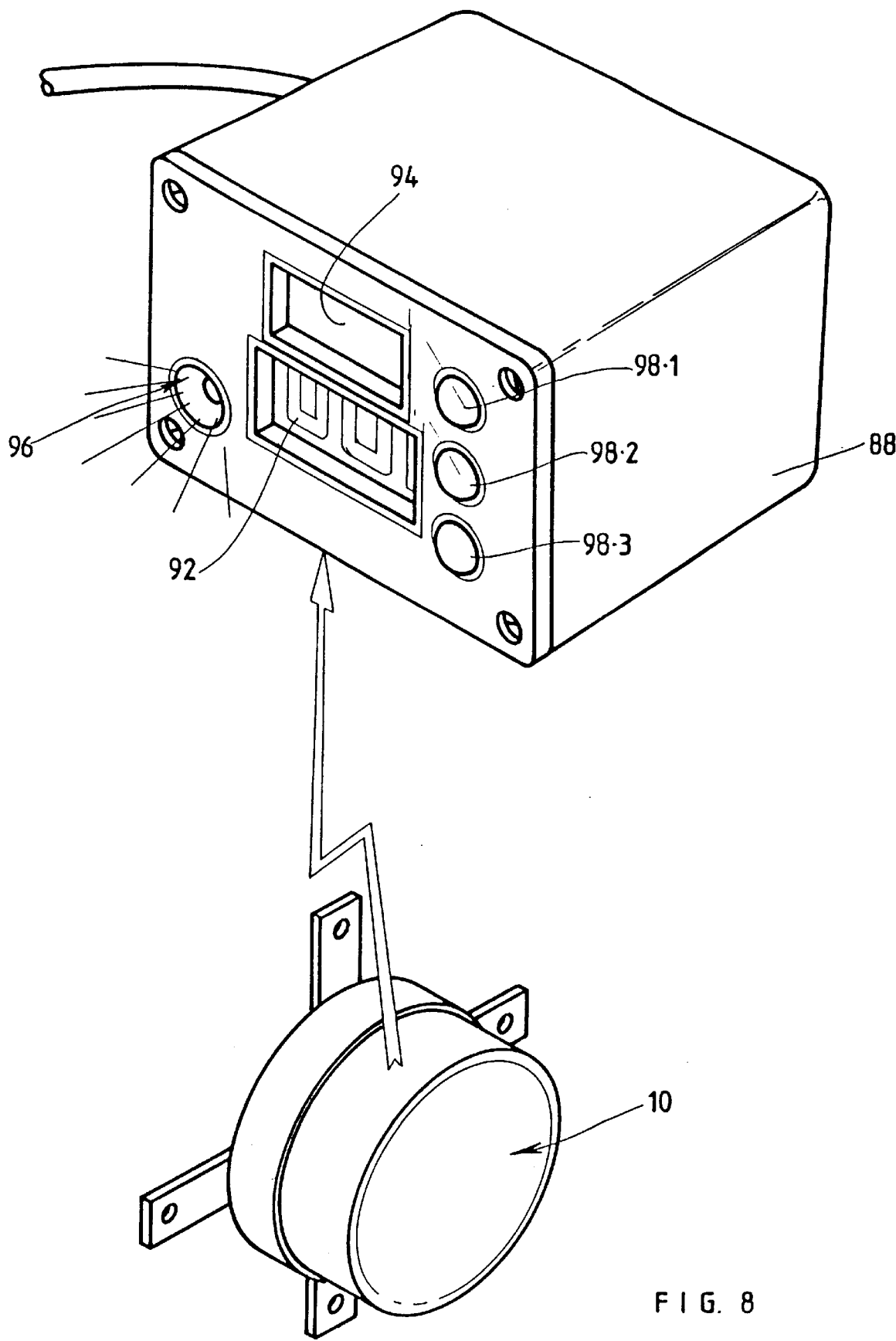
FIG. 8 is a diagrammatic view showing the unit of the invention in contact with the receiver.

The data that is stored in the processor 129 is transferred to the visual display 92, 94 (see FIGS. 8 and 11a). Dual display 94 displays the tire number. Dual display 92 displays the value of either pressure or temperature which value is selected by mode switch 98.1. and indicated via LED's 134.1 and 134.2. A vibration fault is indicated at LED 134.3. The specific wheel orientation of the truck (i.e. the side of the vehicle to which the wheel is attached is indicated by LEDS 133.1 (right) and 133.2 (left). The various tire numbers with their relevant information is down-loaded to the display via the tire numbers switch 98.3. The mode switch 98.1 sorts out the relevant information. This information is displayed for one minute at which time the display clears.

Reset switch 98.2 is used to reset the alarm buzzer 96 and also to set up the desired pressure level at which the alarm will be activated.

It will be understood that the battery stack can be omitted but in practice it is used because it serves to provide a smooth voltage to the circuit and also to operate the circuit even when the wheels are rotating very slowly.

I claim:

1. A tire condition indicating device comprising
   a detector for detecting the condition of a tire on a wheel of a vehicle rotatable about a wheel axis, a signal emitter emitting a signal when the detector detects the said condition,
   a counter connected to the emitter whereby the emitter can transmit a signal equivalent to the number of rotations that each wheel makes during a particular journey and
   power supply means providing power to the signal emitter to emit the signal as aforesaid,
   wherein the power supply means comprises an electric power generator comprising first and second parts that are relatively rotatable about a generator axis, the first part being connected to the wheel to be rotated thereby.

2. A device as claimed in claim 1 wherein the counter counts the number of relative revolutions of the first and second parts of the electric generator.

3. A tire condition indicating device comprising
   a detector for detecting the condition of a tire on a wheel of a vehicle rotatable about a wheel axis,
   a signal emitter emitting a signal when the detector detects the said condition,
   power supply means providing power to the signal emitter to emit the signal as aforesaid, said power supply means comprising an electric power generator having an axis which is coincident with the wheel axis, the generator comprising:
      a first part rotatable with the wheel, and
      a second part that is relatively rotatable to the first part about the generator axis, the second part being rotatably carried by the wheel and being attached to an offset weight which tends to hold the second part stationary when the wheel rotates:
   wherein the offset weight comprises a cross plate and a mass member, the cross plate being attached to the second part, the cross plate being rotatable about its centre, through which the generator axis passes, and the mass member being carried by the cross plate eccentrically of the generator axis.

4. The device as claimed in claim 3 wherein the first part is rotatable with the wheel and wherein the wheel axis and generator axis are coincident.

5. A double wheel arrangement comprising a pair of wheels respectively carrying a pair of tires and a tire indicating device as claimed in claim 3 comprising a pair of detectors coupled respectively to the tires.

6. A device as claimed in claim 3 wherein the mass member comprises a substantially hemi-cylindrical part, the ends of which are connected to the ends of the cross member.

7. A device as claimed in claim 6 incorporating a housing with a generally cylindrical inner part centred on the generator axis and having an opening therein within which the core is received and a rotary support carrying the second part, there being an annular space between the housing and the inner part within which space the hemi-cylindrical part is about the generator axis.

8. A device as claimed in claim 3 wherein the second part comprises a permanent magnet located within an electromagnetic core which comprises the first part there being windings on the core connected to the signal emitter to provide it with electric power.

9. A device as claimed in claim 8 wherein the permanent magnet is arranged with its north/south axis parallel to the generator axis.

10. A device as claimed in claim 3 wherein the the signal emitter comprises a radio frequency transmitter carried by a printed circuit board.

11. A device as claimed in claim 10 wherein the transmitter has an antenna formed from the printed circuit board.

12. A vehicle comprising a plurality of wheels each carrying a tire and tire condition indicating devices as claimed in claim 3.

13. A vehicle as claimed in claim 12 further comprising a driver's cabin and, within the driver's cabin, a receiver for receiving signals from the transmitter.

14. A vehicle as claimed in claim 13 wherein the receiver incorporates indicating means identifying each tire whereby the driver will receive signals indicating the condition of each tire.

15. A device as claimed in claim 3 wherein the detector is a tire pressure detector.

16. A device as claimed in claim 15 for use with a tubeless tire having a valve projecting from the wheel, and wherein the entire pressure detecting incorporates a pressure transducer connected to the valve by a conduit.

17. A device as claimed in claim 16 further comprising a union connected in the conduit and incorporating a valve control member inlet through which the tire can be inflated via the conduit.

18. A device as claimed in claim 15 for use with a tire incorporating a tube that has a valve projecting through the wheel wherein the tire pressure detector comprises a pressure transducer and a conduit connecting the transducer to the valve.

19. A device as claimed in claim 18 further comprising a union connected in the conduit and incorporating a valve control member inlet through which the tire can be inflated via the conduit.

20. A device as claimed in claim 18 wherein the the signal emitter comprises a radio frequency transmitter carried by a printed circuit board and wherein the transducer is mounted on the printed circuit board.

* * * * *

UNITED STATES PATENT AND TRADEMARK OFFICE
CERTIFICATE OF CORRECTION

| | | |
|---|---|---|
| PATENT NO. | : 6,046,672 | Page 1 of 1 |
| APPLICATION NO. | : 08/910487 | |
| DATED | : April 4, 2000 | |
| INVENTOR(S) | : Kevin Patrick Austin Pearman | |

It is certified that error appears in the above-identified patent and that said Letters Patent is hereby corrected as shown below:

On the Cover Sheet:

Please insert the following:
--(30)   Foreign Application Priority Data

July 29, 1996  (ZA) ..........................................................96/6410
  July 29, 1997  (ZA) ..........................................................97/6722--

In the Claims:
Claim 7, line 34 should read as follows:
-- is movable about the generator axis. --

Signed and Sealed this

Second Day of October, 2007

JON W. DUDAS
*Director of the United States Patent and Trademark Office*